United States Patent [19]

Light

[11] 4,355,709
[45] Oct. 26, 1982

[54] VISCOUS FAN DRIVE WITH SELF-SUPPORTING BRUSH HOLDER ASSEMBLY

[75] Inventor: Gerard M. Light, Marshall, Mich.

[73] Assignee: Eaton Corporation, Cleveland, Ohio

[21] Appl. No.: 167,086

[22] Filed: Jul. 9, 1980

[51] Int. Cl.³ ..................... F16D 35/00; F16D 43/25; H01R 39/38
[52] U.S. Cl. ............................... 192/58 B; 192/82 T; 310/239
[58] Field of Search ........................... 192/58 B, 82 T; 310/239, 233, 244, 245

[56] References Cited

U.S. PATENT DOCUMENTS

| | | | |
|---|---|---|---|
| 2,798,979 | 7/1957 | Ernst | 310/239 X |
| 3,055,473 | 9/1962 | Oldberg et al. | 192/58 B |
| 3,313,964 | 4/1967 | Mattson et al. | 310/239 X |
| 3,745,393 | 7/1973 | Spors | 310/239 |
| 4,056,178 | 11/1977 | Detty | 192/58 B |
| 4,112,321 | 9/1978 | Wan | 310/239 |
| 4,271,945 | 6/1981 | Budinski | 192/82 T X |
| 4,271,948 | 6/1981 | Yew | 192/84 T |

FOREIGN PATENT DOCUMENTS

| | | | |
|---|---|---|---|
| 686468 | 12/1939 | Fed. Rep. of Germany | 310/244 |
| 1416827 | 12/1975 | United Kingdom | 310/239 |

*Primary Examiner*—Allan D. Herrmann
*Attorney, Agent, or Firm*—C. H. Grace; J. Yakimow

[57] ABSTRACT

A self-supporting brush holder assembly 10 is disposed on the cylindrical outer surface of a shaft 20 of a viscous fan drive 11 which is rotatable about an axis of rotation 25. The brush holder assembly includes a first portion 12 having a generally C-shaped concave surface 16 and a second portion 14 having a generally C-shaped concave surface 18 which is adaptable to mate with the generally C-shaped concave surface of the first portion to define an annular surface 28 defining a cylindrical opening having its longitudinal axis adapted to be disposed coaxial to the axis of rotation. The cylindrical opening is adapted to surround the cylindrical outer surface of the shaft 20 with the annular surface 28 being disposed contiguous to the cylindrical outer surface of the shaft 20 to support the first and second portions 12, 14 on the shaft 20 to prevent radial movement between the shaft and the first and second portions. The brush holder 10 includes channels 44 located in one of the first and second portions disposed in a generally radial direction and brush members 22 and 24 are located in the channels and are biased in a radially inwardly direction so that one brush member engages with a commutating ring located on the shaft and the other brush member engages with the outer surface of the shaft. The shaft 20 includes an annular groove 50 therein and the annular surface 28 includes a complementary annular land 48 thereon which is adapted to be received in the annular groove 50 of the shaft 20 to positively locate the brush holder relative to the shaft and prevent movement in an axial direction therebetween. A tether member 58 is secured to one portion of the brush holder at one end thereof and is adapted to be secured to a fixed member 64 at the opposite end thereof to prevent rotation of the first and second portions upon rotation of the shaft.

25 Claims, 3 Drawing Figures

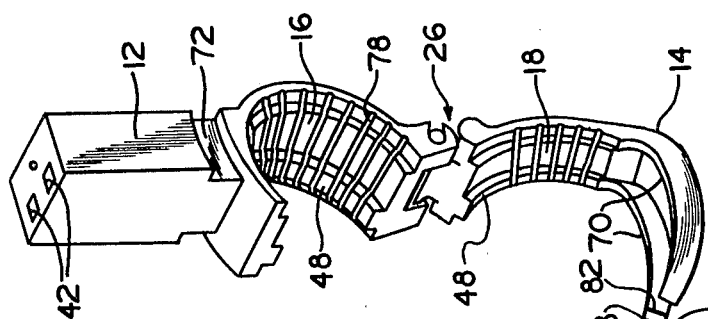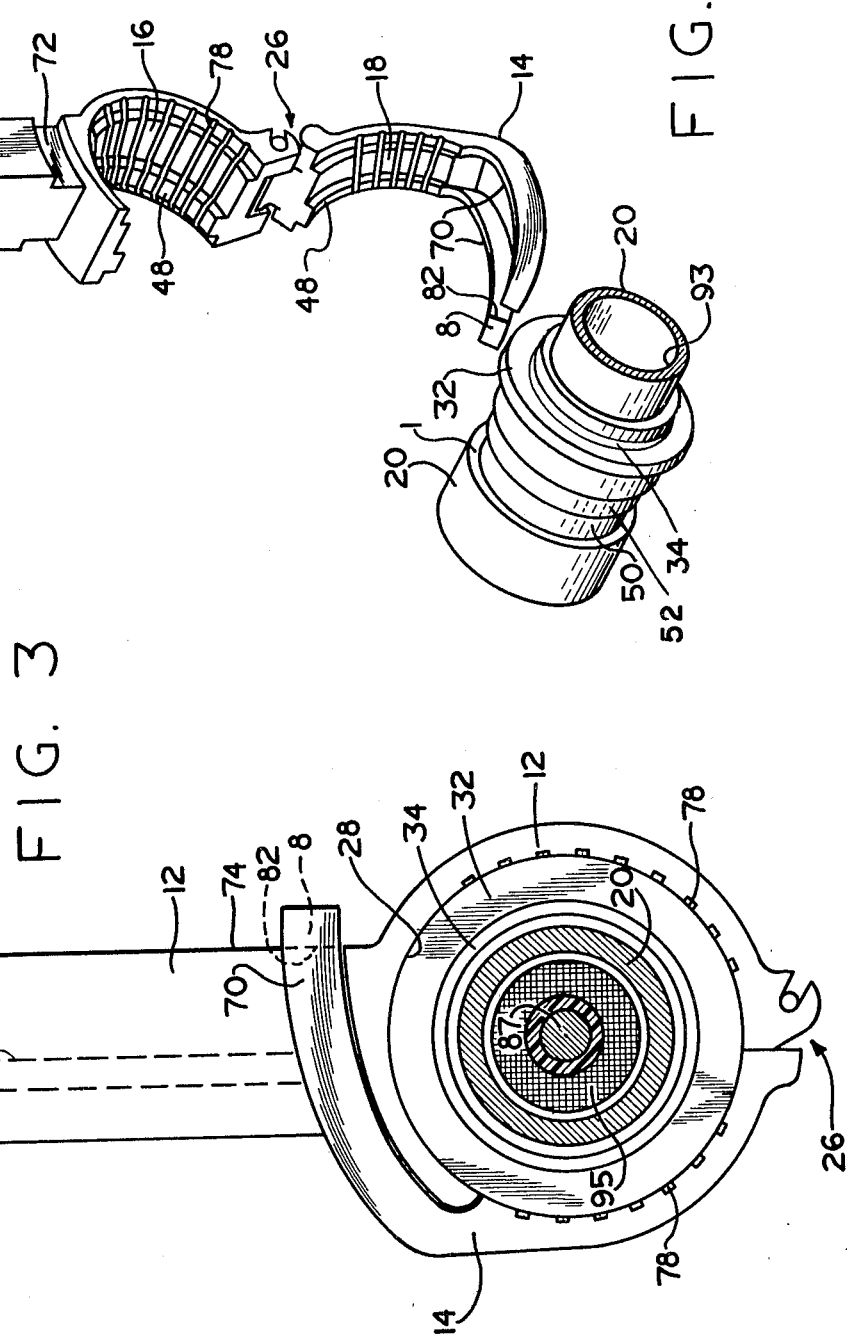

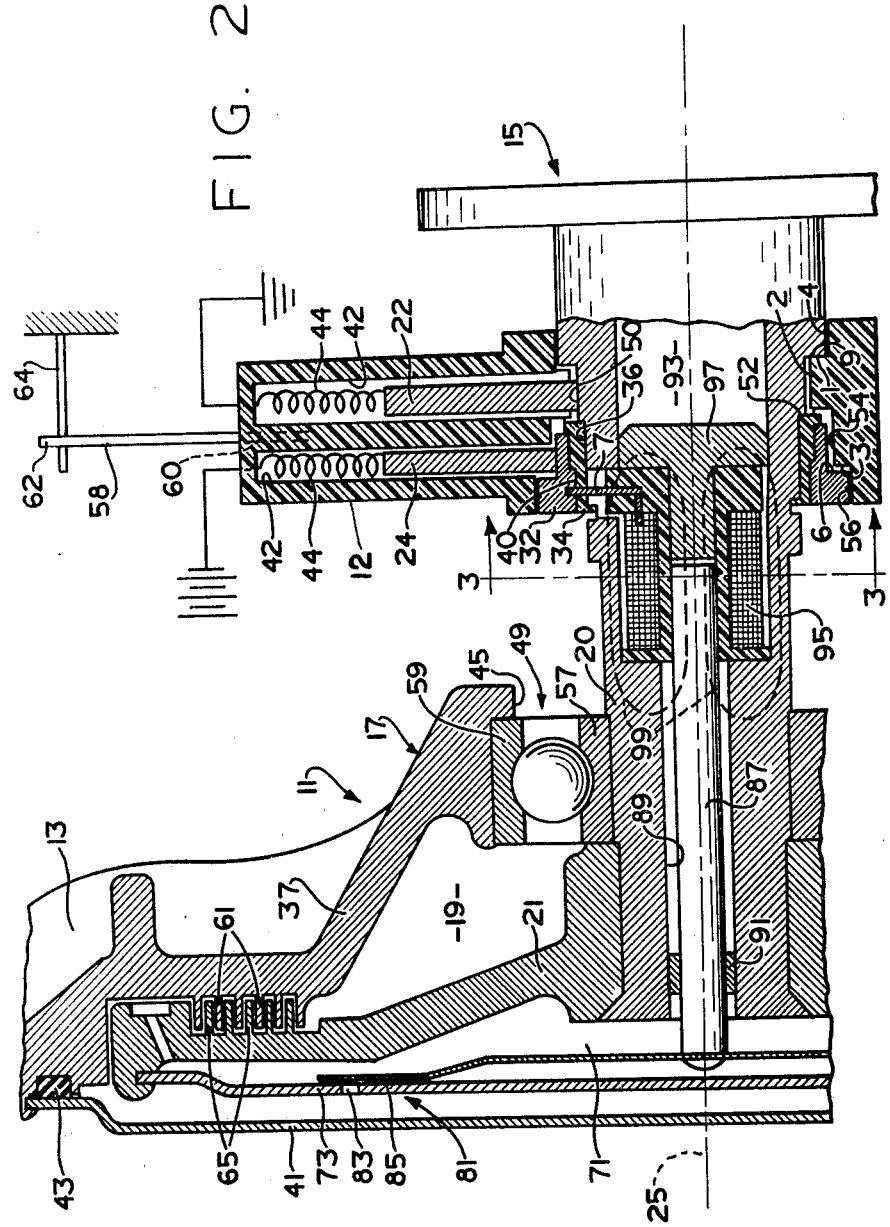

VISCOUS FAN DRIVE WITH SELF-SUPPORTING BRUSH HOLDER ASSEMBLY

BACKGROUND OF THE DISCLOSURE

The present invention relates to a brush holder assembly for directing power to a rotating commutating ring disposed on a rotating shaft and more particularly to a brush holder assembly for transmitting power to a viscous fan drive wherein the brush holder assembly is self-supporting on the shaft of the viscous fan drive and positively locates the brushes supported thereby in a radial direction relative to the shaft and in an axial direction relative to the shaft.

The brush holder assembly of the present invention is preferably a one or two piece molded brush holder assembly which snaps around the exterior cylindrical surface of a shaft and self-supports the brush holder assembly thereon.

Known brush holder assemblies have been molded in one or two pieces and located around a rotating shaft having a commutating ring thereon. The known prior art is exemplified by the Wan U.S. Pat. No. 4,112,321, which discloses a brush holder and brush assembly for a dynamoelectric machine. The holder has an opening which receives the rotating part of the machine to be contacted by the current carrier brushes and includes a plurality of openings to permit the brush holder and brush assembly to be secured to the stator of the machine or some other fixed part thereof. In the Wan device fasteners support the brush holder relative to a rotating shaft and the brush holder is not self supporting on the rotating shaft.

Another example of a molded one-piece brush holder is disclosed in the Spores U.S. Pat. No. 3,745,393, which discloses the use of holes in the carrier to secure the brush holder assembly to the dynamoelectric equipment. Neither Spores nor Wan is self-supporting in that both are supported on a fixed member relative to the rotating commutating structure to prevent movement of the brush holder relative to the commutating structure in both an axial and a radial sense.

SUMMARY OF THE INVENTION

The present invention relates to a new and improved self-supporting brush holder assembly for transmitting power to a rotatable commutating ring disposed on the outer surface of a shaft wherein the brush holder assembly is self-supporting on the outer surface of the shaft and is prevented from moving axially and radially relative to the shaft after it is supported thereon and which provides means for preventing rotation of the brush holder assembly upon rotation of the shaft.

The present invention further provides a new and improved self-supporting brush holder assembly for transmitting power to a rotatable commutating ring located on a cylindrical outer surface of a shaft which is rotatable about an axis of rotation. The brush holder assembly includes a first portion having a generally C-shaped concave surface and a second portion having a generally C-shaped concave surface which is adaptable to mate with the generally C-shaped concave surface of the first portion to define an annular surface defining a cylindrical opening. The cylindrical opening is adapted to surround the cylindrical outer surface of the shaft with the annular surface being disposed contiguous to the cylindrical outer surface of the shaft and supporting the first and second portions on the shaft to prevent radial movement between the shaft and the first and second portions. Channel means are located in one of the first and second portions and disposed in a generally radial direction and brush means is located in the channel means and biased in a radially inward direction to engage with the commutating ring located on the shaft.

The present invention provides a new and improved self-supporting brush holder assembly as set forth in the preceding paragraph wherein the annular surface includes an annular land located thereon and the shaft includes an annular groove located thereon. The annular land is receivable in the annular groove to positively locate the brush holder relative to the shaft to prevent movement in an axial direction therebetween. In addition, a tether member is secured to a fixed member to prevent rotation of the brush holder assembly upon rotation of the shaft. However, the tether provides no other support or alignment.

Another provision of the present invention is to provide a new and improved self-supporting brush holder assembly for transmitting power to a rotating commutating ring disposed in the cylindrical outer surface of a shaft which is rotatable about an axis of rotation. The self-supporting brush holder assembly includes a first member having a generally C-shaped concave surface portion and a second member having a generally C-shaped concave surface portion which is adapted to mate with the generally C-shaped concave surface portion of the first member to define an annular surface defining a cylindrical opening. The first and second members are adapted to be movable relative to each other between a first position in which the C-shaped concave surface portion of the first and second members are spaced apart from each other and a second position in which the C-shaped concave surface portions are disposed contiguous to each other. The annular surface is adapted to surround and be contiguous to the cylindrical outer surface of the shaft when the first and second members are in their second position to support the first and second members in a radial fashion on the cylindrical outer surface of the shaft. The first and second members when in the first position are adapted to receive in a radial direction the shaft on which it is desired to mount the first and second members. Brush means is disposed in a radially inwardly direction to engage the commutating ring and channel means are disposed in one of the first and second members for supporting the brush means for radial engagement with the commutating ring.

Still another provision of the present invention is to provide a new and improved brush holder and commutating ring assembly disposed on the outer cylindrical surface of a shaft which is rotatable about an axis of rotation. The brush holder and commutating ring assembly includes a first member having a generally C-shaped concave surface portion and a second member having a generally C-shaped concave surface portion which is adapted to mate with the generally C-shaped concave surface portion of the first member to define an annular surface defining a cylindrical opening. The first and second members are adapted to move relative to each other between a first position in which the C-shaped concave surface portions of the first and second members are spaced apart from each other to a second position in which the C-shaped concave surface portions are disposed contiguous to each other to define the annular surface. An annular commutating ring is secured to the outer cylindrical surface of the shaft for rotation therewith. The annular surface is adapted to surround and be contiguous to the cylindrical outer surface of the shaft and the annular commutating ring when the first and second members are in the second position to support the first and second members in a radial fashion on the cylindrical outer surface of the shaft and the annular commutating ring. Brush means are biased in a radially inwardly direction to engage the commutating ring located on the shaft and channel means is disposed on one of the first and second members for supporting the brush means for radial engagement with the commutating ring. Securing means are also provided for connecting one of the first and second members to a fixed member to prevent rotation of the first and second members upon rotation of the shaft.

Still another provision of the present invention is to provide a new and improved brush holder and commutating ring assembly as set forth in the preceding paragraph further including hinge means for interconnecting the first and second members to provide for relative movement between the first and second positions and wherein an annular land is disposed on the annular surface and the shaft includes an annular groove located on the cylindrical outer surface thereof. The annular land is receivable in the annular groove to positively locate the first and second members relative to the shaft and prevent relative movement in an axial direction between the shaft and the first and second members.

A further provision of the present invention is to provide a viscous clutch assembly rotatable about an axis of rotation and adapted to be controlled by a sensing element spaced apart from the fluid clutch. The cluth assembly includes a shaft, a first member secured to the shaft for rotation therein, a second member rotatable relative to the first member, shear surfaces located on the first and second members and forming an operating chamber therebetween, a fluid storage chamber and valve members for effecting selective fluid communication between the storage chamber and the operating chamber. Fluid means is disposed within the operating chamber and storage chamber and an electromagnetic actuator is provided to control the position of the valve means and the amount of fluid means in the operating and storage chambers. A commutating ring is located on the shaft and a self-supporting brush holder assembly is provided for transmitting power to the commutating ring to effect energization of the electromagnetic actuator. The brush holder assembly includes a first portion having a generally C-shaped concave surface and a second portion having a generally C-shaped concave surface which is adapted to mate with the generally C-shaped concave surface of the first portion to define an annular surface defining an annular opening surrounding the outer surface of the shaft with the annular surface being disposed contiguous to the outer surface of the shaft to support the first and second portions on the shaft and prevent radial movement of the first and second portions relative to the shaft. Brush means are supported on one of the first and second portions and is biased in a radially inwardly direction to engage with the commutating ring.

DESCRIPTION OF THE DRAWINGS

FIG. 1 is a perspective view of the brush holder of the present invention in its position in which it is receivable around the exterior of a shaft.

FIG. 2 is a fragmentary crosssectional view of a viscous fan drive and the brush holder assembly located on the shaft of the viscous fan drive.

FIG. 3 is a crosssectional view taken approximately along the lines 3—3 of FIG. 2.

DESCRIPTION OF THE PREFERRED EMBODIMENT

Referring to the drawings, a brush holder assembly 10 for supporting a pair of brushes 22, 24 relative to a rotating shaft 20 is disclosed.

The brush holder assembly 10 is operable to transmit energy to a viscous fan drive 11 more particularly disclosed in FIG. 2. The viscous fan drive 11 may be similar to that disclosed in the Detty, U.S. Pat. No. 4,056,178 which is incorporated by reference herein.

The viscous fan drive or fluid coupling 11 drives a fan not illustrated from a water pump of a vehicle (not illustrated. The water pump is attached to a rotatable input member 15 in a well known manner to effect rotation of the input member 15. The fluid coupling 11 includes an output member 17 which is rotatable relative to the input member 15. Input coupling member 15 is driven from the water pump and when so driven, rotates in a working chamber 19 defined between the input and output coupling members 15, 17. The input coupling member 15 comprises a radially extending portion 21 and a hub or shaft portion 20 which is located concentric to the axis of rotation 25 of the unit 11. The hub or shaft portion 20 extends axially and is press fitted or connected in a suitable fashion to the radially extending portion 21 for rotation therewith.

Rotation of the input coupling member 15 transmits torque to the relatively rotatable output member 17 through a fluid shear medium, such as silicone fluid. The output coupling member 17 comprises a disc-shaped plate member 37 and a plate-like cover member 41 which may have a plurality of cooling fins 13 thereon. The cover member 41 and disc-shaped member 37 are joined at their peripheries by any suitable connector means and are sealed by a seal 43 to prevent leakage. The output member 17 cooperates with the input member 15 to form the working chamber 19 within which the silicon fluid is disposed. The plate member 37 includes an annular opening 45 at its central portion through which the axially extending shaft 20 extends. A suitable bearing 49 is disposed between the opening 45 and the outer surface of shaft 20 to provide for relative rotation between the shaft 20 and the output member 17. The bearing 49 includes an inner bearing race 57 which is secured to the shaft 20 of the input member 15 for rotation therewith and an outer race 59 which is secured to the output member 17 for rotation therewith. The bearing 49 provides for relative rotation of the input coupling member 15 and the output coupling member 17.

A fan blade assembly, not illustrated, is secured to the member 37 for rotation therewith. The fan blades will operate to draw air through the radiator of the vehicle in a well known manner upon rotation of the output coupling member 17.

The member 37 of driven coupling member 17 includes a plurality of concentric annular coupling lands 61 which are disposed in the operating chamber 19. The radially extending portion 21 of the driving coupling member 15 also includes a plurality of annular concentric coupling lands 65. The annular lands 65 are positioned in an axially overlapping relationship with the annular coupling lands 61 of the driven clutch member 17 so that the grooves disposed between the lands of one of the members receives the lands of the other member and vice versa, to form the fluid operating chamber disposed between the lands. The aforementioned coupling grooves 61, 65 are disposed in position so that when oil or other viscous fluid means, such as silicon oil, is disposed between the lands 61, 63 torque can be transmitted from the input coupling member to the output coupling member by either viscous shear or hydromechanical coupling. The volume of fluid in the coupling chamber 19 controls the degree of coupling and relative rotation between the input member 15 and the output member 17. The operation of the alternating lands and grooves to couple the input member 15 and output member 17 is more fully disclosed in U.S. Pat. No. 4,056,178, which is incorporated herein by reference.

A suitable pumping means provides for fluid flow from the operating chamber 19 to a fluid reservoir 71 which is defined between the radially extending portion 21 of the input member and a disc-shaped cover portion 73 which is secured to the radially extending portion 21 of the input member 15 for rotation therewith. A suitable fluid is provided for fluid communication from the operating chamber 19 to the fluid reservoir 71.

A valve means 81 is provided to control fluid flow from the reservoir 71 to the operating chamber 19. The valve means 81 includes a valve opening 83 and a valve member 85. The valve member 85 is disposed on a valve shaft 87 for movement in an axial direction parallel to the axis of rotation 25. The valve member 85 is movable from a position in which it blocks the fluid flow through the valve opening 83 to a position in which the valve member 85 is spaced apart from the valve opening 83 to allow fluid to flow from the reservoir 71 to the operating chamber 19. The valve member 85 is adapted to be positioned to cover and uncover the valve opening 83 to selectively control fluid flow from the reservoir 71 to the operating chamber 19. Movement of the valve shaft 87 positions the valve member 85 relative to the valve opening 83 to control the flow therethrough. The function of valve member 85, which is to open and close valve opening 83 to thereby control the fluid flow from the reservoir 71 to the operating chamber 19 and to control the volume of fluid in operating chamber 19 and the coupling between the input member 15 and the output member 17, is well known in the art and is more fully described in U.S. Pat. No. 3,055,473 which is incorporated herein by reference.

The valve shaft 87 is located within a coaxial opening 89 disposed in the shaft 20. A suitable lining or bushing 91 may be provided in the opening 89 to provide for and guide movement of the valve shaft or armature 87. The valve shaft 87 is adapted to move in a direction parallel to the axis of rotation 25 to move the valve member 85 from a first position in which it blocks opening 83 to a second position in which it is spaced apart from the opening 83 and allows fluid flow therethrough. A cavity 93 is located in the shaft member 20. The cavity 93 is a cylindrical cavity and includes an electromagnetic coil 95 disposed therein. A magnetic end piece 97 is disposed within the cylindrical cavity 93 and is located at one end of the coil 95. Energization of the coil 95 establishes a flux path 99 which sequentially passes through the armature 87, the end piece 97, around the shaft 20 and back to the armature 87 through the center of coil 95. The energization of the coil 95 and the establishment of the flux field 99 causes the armature or valve shaft 87 to move to the right as viewed in the Figures to thereby space apart the valve member 85 from the valve opening 83 and provide for fluid flow from the reservoir 71 to the operating chamber 19. The energization of coil 95 thus controls the position of valve member 85 and hence the amount of fluid in operating chamber 19 which controls the coupling between the input and output member in a well known manner.

A sensor (not illustrated) is provided to control the energization of coil 95. Preferably, the sensor senses the temperature of water in the radiator of the vehicle and controls the energization of coil 95 in response thereto. The brush holder assembly 10 is provided to connect the coil 95 with a source of power controlled by the remote sensor.

The brush holder assembly 10 includes a first member 12 and a second member 14. The member 12 includes a generally C-shaped stepped concave surface portion 16 thereon and the member 14 includes a generally C-shaped stepped concave surface 18 thereon. The members 12 and 14 include a hinge structure 26 which provides for relative movement between the members 12 and 14. The members 12 and 14 have a first position, as illustrated in FIG. 1, in which the C-shaped surface 16 is spaced apart from the C-shaped surface 18 and in which the brush holder 10 is adapted to receive the shaft 20 disposed therein and a second position, as illustrated in FIG. 3, wherein the C-shaped surfaces 16 and 18 are disposed contiguous to each other and define a substantially continuous annular surface 28 which is adapted to surround and be disposed contiguous to the outer cylindrical surface of the shaft 20. The hinge structure 26 allows for the members 12 and 14 to move from their position shown in FIG. 1 in which the brush holder 10 is adapted to receive a shaft 20 disposed therein to their position shown in FIG. 3 in which the brush holder 10 is mounted around the outer cylindrical surface of the shaft 20.

While the brush holder 10 has been disclosed as being composed of two members 12 and 14, it should be appreciated that the members 12 and 14 could be molded in an integral fashion and that the members 12 and 14 could be portions of one and the same member. It would also be possible to modify the hinge construction and alleviate the need for hinge 26 if the portions 12, 14 were integrally molded.

Fastening means in the form of the arms 70 are preferably attached to one end of the member 14. The arms 70 are adapted to straddle and engage with a surface 72 disposed on the member 12 of the brush holder 10. As is more fully illustrated in FIG. 1, the arms 70 each include a shoulder portion 8 thereon. The shoulder portion 8 is adapted to engage with a surface 74 on member 12 when the member 14 is moved to its position illustrated in FIG. 3 to thereby lock the member 14 into a contiguous arrangement with the member 12 when the shoulders 82 engage with the surface 74. The coaction of the shoulders 82 and surface 74 secures the brush holder 10 about the cylindrical outer surface of the shaft 12.

The shaft 20 is adapted to rotate about an axis of rotation 25. A commutating ring 32 is adapted to be secured to the shaft 20 for rotation therewith in a well known manner. An insulating member 34 is preferably secured to the outer cylindrical surface of the shaft 20 for rotation therewith and supports the commutating ring 32 in an insulated relationship relative to the shaft 20. The insulator ring 34 is adapted to be secured in an annular stepped groove 36 disposed on the outer cylindrical surface of the shaft 20 to fix the insulator ring 34 to the shaft 20 for rotation therewith. The insulator ring 34 includes an outer annular stepped surface 40 on which the commutating ring 32 is located. The commutator ring 32 is affixed to the insulator member 34 for rotation therewith in a well known manner. Thus, it should be apparent that the commutating ring 32 is insulated from the shaft 20 and is located thereon for rotation therewith by the insulator ring 34. A suitable lead 7, from coil 95, can be attached to the commutating ring 32 to supply power therefrom to the coil 95 mounted within the cavity 93 of shaft 20 for rotation therewith. The lead 7 connects the commutating ring 32 to the coil 95 to which it is desired to direct power in a well known manner.

When the first and second members 12, 14 of the brush holder 10 are disposed in their positions illustrated in FIG. 3, the C-shaped concave surface portions 16, 18, cooperate to form the annular stepped surface 28 which is disposed around the cylindrical outer surface of the shaft 20 to support the brush holder 10 in a radial fashion relative to the shaft 20. The member 12 of brush holder 10 includes a pair of channels 42 disposed therein. The pair of channels 42 are disposed in a radial direction relative to the axis of rotation 25 of the shaft 20 and each of the channels is adapted to support one of brush members 22, 24. Suitable spring means, such as the coil springs 44, are disposed in each of the channels 42 to bias its associated brush 22, 24 in an inwardly radial direction to effect engagement of the brush with the shaft 20 or the commutating ring 32. As is more fully illustrated in FIG. 2, the brush 24 is biased into engagement with the commutating ring 32 and the brush 22 engages the outer cylindrical surface of the shaft 20. Preferably, the brush 22 is connected to the ground portion of the electrical circuit for energizing the brush holder and commutating ring assembly and the brush 24 is connected to the positive side of the electrical power supply. A circuit can then be completed from the positive side of the power supply through the brush 24, through the commutating ring 32, through the wire 7, through the coil 95 to be energized and back through the shaft 20, through the brush 22, to the ground portion of the power supply.

The annular surface 28 formed from the C-shaped concave surface portions 16 and 18 includes an annular land 48 disposed thereon. The shaft 20 includes an annular groove 50 disposed on the outer circumference thereof. The annular land 48 on the brush holder 10 is adapted to mate with and be received within the annular groove 50 disposed on the outer cylindrical surface of the shaft 20 as is more fully illustrated in FIG. 2. The location of the annular land 48 within the annular groove 50 positively positions the brush holder assembly 10 on the shaft 20 in an axial direction and the groove 50 cooperates with the land 48 to prevent relative movement in an axial direction therebetween.

The insulating ring 34 includes an annular surface portion 52 thereon which in part defines the annular groove 50 located on the outer cylindrical surface of the shaft 20. Thus, once the brush holder 10 is secured around the shaft 20 it will be positively located thereon by the cooperation of the groove 50 and annular land 48 to prevent relative movement in an axial direction between the brush holder 10 and the shaft 20.

The annular surface 28 of the brush holder 10 cooperates with the outer cylindrical surface of the shaft 20 to support the brush holder 10 thereon. The annular surface 28 supports the brush holder 10 and prevents relative movement in a radial direction between the shaft 20 and the brush holder 10. While the surface 28 has been described as being an annular surface, it should be appreciated from the figures that the surface 28 is meant to refer to the stepped internal surface portions of the brush holder 10 which mates with the cylindrical outer surface portion of the shaft 20 or the cylindrical outer surface portion of the commutating ring 32 which is supported on the cylindrical outer surface of the shaft 20 by the insulating ring 34. It is important that the tolerances between the surface portion 28 and the outer cylindrical surface of the shaft 12 and the annular commutating ring 32 be held to a minimum in order that the brush holder 10 be self-supporting. To this end, the cylindrical surface 28 of the holder 10 includes annular surface portions 2, 4, 54 and 56. The annular surface portion 4 is a bearing surface which supports the brush holder 10 on the outer annular surface of the shaft 20. The surface portion 56 is a bearing surface portion which supports the brush holder 10 on the outer surface of the annular commutating ring 32. The brush holder 10 also includes radially extending annular surface portions 3 and 1 which respectively engage with radially extending annular surface portion 6 on the commutating ring 32, and radially extending annular surface portion 9 on the shaft 20 to prevent relative movement of the brush holder 10 in an axial direction relative to the shaft 20 and the commutating ring 32.

The C-shaped surface portions 16, 18 each include a plurality of axially extending grooves 78 disposed therein. The grooves 78 provide weakened portions in the member 12 to allow the concave surface portion 16 thereof to snap over the surface 50 into engagement with the outer cylindrical surface of the shaft 20 and the outer cylindrical surface of the commutating ring 32. The grooves 78 also provide a place for foreign matter to escape the brush holder assembly. If foreign matter is disposed on the outer surface of the shaft 20 or the outer surface of the commutating ring 32, it will be scraped from the shaft 20 and the commutating ring 32 by a wiping action of the surfaces 16 and 18 on the outer cylindrical surface of the shaft 20 and ring 32. Foreign material will have a tendency to accumulate in the grooves 78 and be moved therefrom in an axial fashion. The grooves 78 also allow for expansion and contraction of the members 12, 14 during the molding operation to alleviate distortion that would occur due to thick and thin sections.

After the brush holder 10 is located around shaft 20 and commutating ring 32, it is necessaray to prevent rotation of the brush holder 10 with rotation of the shaft 20. To this end, a tether member 58 is provided. The tether member 58 has one end 60 affixed to the member 12 of the brush holder 10. The opposite end, 62, of the tether member 58 is loosely retained by a fixed member 64. The fixed member 64 is secured to any support structure and provides a stop which retains the end 62 of the tether 58 to prevent movement thereof relative to the stop 64. Thus, the tether member 58 engages the stop 64 and the member 12 of the brush holder 10 to prevent rotation of the brush holder 10 upon rotation of the shaft 20. When the brush holder 10 is utilized with the viscous coupling 11, the stop 64 can comprise a stationary portion of the engine of the vehicle or a stationary portion of the water pump.

It should be appreciated that the present construction provides a self-supporting brush holder 10 in contrast to the known prior art wherein the brush holders were normally secured to a fixed member in a location at which the brushes could engage the commutating structure. In the present invention the brush holder 10 is self-supporting relative to the shaft 20 in both a radial and axial direction. The tether member 58 does not act to support the brush holder 10 but rather acts as a stop to prevent rotation of the brush holder 10 upon rotation of the shaft 20.

From the foregoing it should be apparent that a new and improved viscous fan drive has been provided which includes a self-supporting brush holder for providing power to a rotating coil disposed in the viscous fan drive. The self-supporting brush holder assembly transmits power to a rotatable commutating ring disposed on the cylindrical outer surface of a shaft of the viscous fan drive which is rotatable about an axis of rotation. The brush holder includes a first portion having a generally C-shaped concave surface and a second portion having a generally C-shaped concave surface which is adaptable to mate with the generally C-shaped concave surface of the first portion to define an annular surface defining a cylindrical opening having its longitudinal axis adapted to be disposed coaxial to the axis of rotation. The cylindrical opening is adapted to surround the cylindrical outer surface of the shaft with the annular surface being disposed contiguous to the cylindrical outer surface of the shaft and supporting the brush holder on the shaft to prevent radial and axial movement between the shaft and the brush holder. The brush holder further includes channel means disposed in a generally radial direction relative to the axis of rotation and brush means located in the channel means and biased in a radially inward direction to engage the commutating ring located on the shaft.

I claim:

1. A self-supporting brush holder assembly for transmitting power to a rotatable commutating ring disposed on the cylindrical outer surface of a shaft assembly comprising a first portion having a generally C-shaped concave surface and a second portion having a generally C-shaped concave surface which is adaptable to mate with said generally C-shaped concave surface of said first portion to define an annular surface defining a cylindrical opening having its longitudinal axis adapted to be disposed coaxial to said axis of rotation, said cylindrical opening defined by said annular surface being adapted to surround said cylindrical outer surface of the shaft with said annular surface being disposed contiguous to the cylindrical outer surface of said shaft and supporting said first and second portions on the shaft to prevent radial movement between the shaft and said first and second portions, channel means located on one of said first and second portions and disposed in a generally radial direction relative to the axis of rotation, brush means located in said channel means and being biased in a radially inwardly direction to engage with the commutating ring located on the shaft, a surface projection disposed on one of said annular surface or said cylindrical outer surface of the shaft and an indentation disposed on the other of said annular surface or the cylindrical outer surface of the shaft, said projection cooperating with said indentation to positively locate said brush holder relative to the shaft and prevent movement in the axial direction therebetween.

2. A self-supporting brush holder assembly as defined in claim 1 wherein said projection comprises an annular land located on said annular surface and said indentation comprises an annular groove located on the cylindrical surface of the shaft, said annular land being receivable in said annular groove to positively locate said brush holder relative to the shaft and prevent movement in an axial direction therebetween.

3. A self-supporting brush holder assembly as defined in claim 2 further including securing means for connecting said brush holder assembly to a fixed member to prevent rotation of said brush holder assembly upon rotation of the shaft.

4. A self-supporting brush holder assembly as defined in claim 3 wherein said securing means comprises a tether member secured to one of said first and second portions at one end thereof and adapted to be secured to a fixed member at the opposite end thereof to prevent rotation of said brush holder assembly upon rotation of the shaft.

5. A self-supporting brush holder assembly for transmitting power to a rotatable commutating ring disposed on the cylindrical outer surface of a shaft rotatable on an axis of rotation, said brush holder assembly comprising a first member having a generally C-shaped concave surface and a second member having a generally C-shaped concave surface which is adaptable to mate with said generally C-shaped concave surface of said first member to define an annular surface defining a cylindrical opening having its longitudinal axis adapted to be disposed coaxial to said axis of rotation, said first and second members being movable relative to each other between a first position in which said concave surface of said first member is spaced apart from said concave surface of said second member and a second position in which said concave surface of said first member is disposed contiguous to and mates with said concave surface of said second member to define said annular surface, said first and second members when in said first position, being adapted to receive in a substantially radial direction the shaft therebetween and when in said second position, said cylindrical opening defined by said annular surface being adapted to surround said cylindrical outer surface of the shaft with said annular surface being disposed contiguous to the cylindrical outer surface of said shaft and supporting said first and second members on the shaft to prevent radial movement between the shaft and said first and second members, channel means located on one of said first and second members and disposed in a generally radial direction relative to the axis of rotation and brush means located in said channel means and being biased in a radially inwardly direction to engage with the commutating ring located on the shaft.

6. A self-supporting brush holder assembly as defined in claim 5 wherein said first and second concave surface portions include a plurality of slots therein extending in a substantially axial direction.

7. A self-supporting brush holder assembly as defined in claim 5 further including hinge means for interconnecting said first and second members to provide for relative movement of said first and second members between said first and second positions.

8. A self-supporting brush holder assembly as defined in claim 7 further including fastener means for connecting said first and second members and securing said first and second members in said second position and preventing movement of said first and second members to said first position.

9. A self-supporting brush holder assembly as defined in claim 7 wherein said first and second concave surfaces include a plurality of slots therein extending in a substantially axial direction.

10. A self-supporting brush holder assembly for transmitting power to a rotatable commutating ring disposed on the cylindrical outer surface of a shaft rotatable on an axis of rotation, said brush holder assembly comprising a first portion having a generally C-shaped concave surface and a second portion having a generally C-shaped concave surface which is adaptable to mate with said generally C-shaped concave surface of said first portion to define an annular surface defining a cylindrical opening having its longitudinal axis adapted to be disposed coaxial to said axis of rotation, said cylindrical opening defined by said annular surface being adapted to surround said cylindrical outer surface of the shaft with said annular surface being disposed contiguous to the cylindrical outer surface of said shaft and supporting said first and second portions on the shaft to prevent radial movement between the shaft and said first and second portions, a plurality of slots on said first and second concave surfaces extending in a substantially axial direction, channel means located on one of said first and second portions and disposed in a generally radial direction relative to the axis of rotation and brush means located in said channel means and being biased in a radially inwardly direction to engage with the commutating ring located on the shaft.

11. A self-supporting brush holder assembly for transmitting power to a rotatable commutating ring disposed on the cylindrical outer surface of a shaft which is rotatable about an axis of rotation comprising an annular groove on said shaft, a first member having a generally C-shaped concave surface portion, a second member having a generally C-shaped concave surface portion which is adapted to mate with said generally C-shaped concave surface portion of said first member to define an annular surface defining a cylindrical opening having its longitudinal axis adapted to be disposed coaxial to said axis of rotation, said first and second members being adapted to be movable relative to each other between a first position in which said C-shaped concave surface portion of said first and second members are spaced apart from each other and a second position in which said C-shaped concave surface portions are disposed contiguous to each other to define said annular surface, said annular surface being adapted to surround and be contiguous to the cylindrical outer surface of the shaft when said first and second members are in said second position to support said first and second members in a radial fashion on said cylindrical outer surface of the shaft, said first and second members when in said first position being adapted to receive in a radial direction the shaft on which it is desired to mount said first and second members and being movable to said second position to surround the outer cylindrical surface of the shaft by said annular surface to thereby secure and support said first and second members on the shaft, brush means disposed in a radially inwardly direction to engage the commutating ring located on the shaft, channel means disposed on one of said first and second members for supporting said brush means for radial engagement with the commutating ring and an annular land located on said annular surface, said annular land being receivable in the annular groove on the shaft when said first and second members are in said second position to positively locate said brush holder relative to the shaft and prevent relative movement in an axial direction therebetween.

12. A self-supporting brush holder assembly as defined in claim 11 further including securing means for connecting said brush holder assembly to a fixed member to prevent rotation of said brush holder assembly upon rotation of the shaft.

13. A self-supporting brush holder assembly as defined in claim 12 wherein said securing means comprises a tether member secured to one of said first and second members at one end thereof and adapted to be secured to a fixed member at the opposite end thereof to prevent rotation of said first and second members upon rotation of the shaft.

14. A self-supporting brush holder assembly as defined in claim 11 further including securing means for connecting one of said first and second members to a fixed member to prevent rotation of said first and second members upon rotation of the shaft.

15. A self-supporting brush holder assembly for transmitting power to a rotatable commutating ring disposed on the cylindrical outer surface of a shaft which is rotatable about an axis of rotation comprising a first member having a generally C-shaped concave surface portion, a second member having a generally C-shaped concave surface portion which is adapted to mate with said generally C-shaped concave surface portion of said first member to define an annular surface defining a cylindrical opening having its longitudinal axis adapted to be disposed coaxial to said axis of rotation, said first and second members being adapted to be movable relative to each other between a first position in which said C-shaped concave surface portion of said first and second members are spaced apart from each other and a second position in which said C-shaped concave surface portions are disposed contiguous to each other to define said annular surface, said annular surface being adapted to surround and be contiguous to the cylindrical outer surface of the shaft when said first and second members are in said second position to support said first and second members in a radial fashon on said cylindrical outer surface of the shaft, hinge means for interconnecting said first and second members to provide for relative movement between said first and second members between said first position and said second position, said first and second members when in said first position being adapted to receive in a radial direction the shaft on which it is desired to mount said first and second members and being movable to said second position to surround the outer cylindrical surface of the shaft by said annular surface to thereby secure and support said first and second members on the shaft, brush means disposed in a radially inwardly direction to engage the commutating ring located on the shaft and channel means disposed on one of said first and second members for supporting said brush means for radial engagement with the commutating ring.

16. A self-supporting brush holder assembly as defined in claim 15 further including fastener means for connecting said first and second members and securing said first and second members in said second position and preventing movement of said first and second members to said first position.

17. A self-supporting brush holder assembly as defined in claim 8 or 16 wherein said fastener means are resiliently biased to secure said first and second members in said second position.

18. A self-supporting brush holder and commutating ring assembly disposed on an outer cylindrical surface of a shaft which is rotatable about an axis of rotation comprising a first member having a generally C-shaped concave surface portion, a second member having a generally C-shaped concave surface portion which is adapted to mate with said generally C-shaped concave surface portion of said first member to define an annular surface defining a cylindrical opening having its longitudinal axis disposed coaxial to said axis of rotation, said first and second members being adapted to be movable relative to each other between a first position in which said C-shaped concave surface portions of said first and second members are spaced apart from each other to a second position in which said C-shaped concave surface portions are disposed contiguous to each other to define said annular surface, hinge means for interconnecting said first and second members to provide for relative movement of said first and second members between said first position and said second position, an annular commutating ring secured to said outer cylindrical surface of said shaft for rotation therewith, said annular surface being adapted to surround and be contiguous to the cylindrical outer surface of the shaft and said annular commutating ring when said first and second members are in said second position to support said first and second members on said cylindrical outer surface of said shaft and said annular commutating ring to prevent relative movement therebetween in a radial direction, brush means biased in a radially inward direction to engage said commutating ring located on the shaft, channel means disposed on one of said first and second members for supporting said brush means for radial engagement with said commutating ring and securing means for connecting one of said first and second members to a fixed member to prevent rotation of said first and second members upon rotation of the shaft.

19. A self-supporting brush holder and commutating ring assembly as defined in claim 18 wherein said securing means comprises a tether member secured to one of said first and second members at one end thereof and adapted to be secured to a fixed member at the opposite end thereof to prevent rotation of said first and second members upon rotation of said shaft.

20. A self-supporting brush holder and commutating ring assembly as defined in claim 18 further including an annular insulating member secured to the outer cylindrical surface of the shaft for rotation therewith, said insulator member supporting said annular commutating ring on the shaft for rotation therewith and insulating said commutating ring from the shaft.

21. A self-supporting brush holder and commutating ring assembly as defined in claim 18 wherein said brush means comprises a pair of brush members both of which are biased in a radially inwardly direction and whereby one of said brush members engages said annular commutating ring and the other of said brush members engages the outer cylindrical surface of the shaft and said channel means includes a pair of channels, one of which supports one of said brush members and the other of which supports the other of said brush members for radial engagement with said annular commutating ring and the outer cylindrical surface of the shaft.

22. A self-supporting brush holder and commutating ring assembly as defined in claim 21 wherein an annular hand is disposed on the annular surface formed by said first and second members and the shaft includes a complementary annular groove located on the cylindrical outer surface thereof, said annular land being receivable in said annular groove to positively locate said first and second members relative to the shaft and prevent relative movement in an axial direction between the shaft and said first and second members.

23. A viscous fluid clutch assembly rotatable on an axis of rotation and adapted to be controlled by a sensing element spaced apart from the fluid clutch comprising an axially extending shaft disposed on the axis of rotation, a first member secured to said shaft for rotation therewith, a second member rotatable relative to said first member, shear surfaces disposed on said first and second members and forming an operating chamber therebetween, a fluid storage chamber disposed adjacent to said operating chamber, valve means effecting selective communication between said storage chamber and said operating chamber and including a valve member having a first and a second position, one of said positions providing for fluid communication between said storage chamber and said operating chamber and the other of said positions blocking such fluid communication, fluid means disposed within said storage chamber and being selectively displaced into said operating chamber when said valve member is in said one position to provide in said operating chamber a medium to transmit rotational motion from one of said members to the other of said members, an electromagnetic actuator operatively associated with said valve member to effect movement of said valve member between said first and second position in response to energization thereof, a commutating ring secured to said shaft for rotation therewith and a self-supporting brush holder assembly for transmitting power through said commutating ring to effect energization of said electromagnetic actuator, said brush holder including a first portion having a generally C-shaped concave surface and a second portion having a generally C-shaped concave surface which is adapted to mate with said generally C-shaped concave surface of said first portion to define an annular surface defining a cylindrical opening surrounding the cylindrical outer surface of the shaft with said annular surface being disposed contiguous to the cylindrical outer surface of the shaft and supporting said first and second portions on said shaft to prevent radial movement between said shaft and said first and second portions and brush means supported by one of said first and second portions and biased in a radially inward direction to engage with said commutating ring.

24. A viscous fluid clutch as set forth in claim 23 wherein said annular surface includes an annular land located thereon and said shaft includes an annular groove located on the outer cylindrical surface thereof, said annular land being receivable in said annular groove to positively locate said brush holder relative to said shaft and prevent movement in an axial direction therebetween.

25. A viscous fluid clutch as defined in claim 24 further including a tether member secured to one of said first and second portions of said brush holder at one end thereof and adapted to be secured to a fixed member at the opposite end thereof to prevent rotation of said brush holder upon rotation of said shaft.

* * * * *